United States Patent [19]

Muraji

[11] Patent Number: 5,561,739
[45] Date of Patent: Oct. 1, 1996

[54] DEFUZZIFIER CURCUIT

[75] Inventor: Tetsuo Muraji, Odawara, Japan

[73] Assignee: Mikuni Corporation, Tokyo, Japan

[21] Appl. No.: 292,292

[22] Filed: Aug. 17, 1994

Related U.S. Application Data

[63] Continuation of Ser. No. 845,609, Mar. 4, 1992, abandoned.

[30] Foreign Application Priority Data

Apr. 15, 1991 [JP] Japan ..................................... 3-109709
May 7, 1991 [JP] Japan ..................................... 3-131869

[51] Int. Cl.$^6$ ........................... G06G 7/00; G05B 13/00; G06F 9/44
[52] U.S. Cl. .................................. 395/3; 395/900
[58] Field of Search .................................. 395/3, 10, 11, 395/61, 900, 72, 76; 364/807

[56] References Cited

U.S. PATENT DOCUMENTS

| | | | |
|---|---|---|---|
| 5,046,019 | 9/1991 | Basehore | 395/22 |
| 5,136,685 | 8/1992 | Nagazumi | 395/3 |
| 5,142,664 | 8/1992 | Zhang | 395/3 |
| 5,167,005 | 11/1992 | Yamakawa | 395/3 |
| 5,179,625 | 1/1993 | Hisano | 395/3 |
| 5,228,111 | 7/1993 | Nagazumi | 395/3 |
| 5,245,695 | 9/1993 | Basehore | 395/3 |
| 5,259,063 | 11/1993 | Salazar | 395/3 |
| 5,267,348 | 11/1993 | Someya et al. | 395/76 |

FOREIGN PATENT DOCUMENTS

| | | |
|---|---|---|
| 1-224802 | 9/1989 | Japan . |
| 2-054302 | 2/1990 | Japan . |
| 2-054301 | 2/1990 | Japan . |

OTHER PUBLICATIONS

Zhao et al, "Defuzzification of fuzzy intervals"; Proceedings. First Internation Symposium on Uncertainty Modeling and Analysis, pp. 392–397, 3–5 Dec. 1990.

*Primary Examiner*—Robert W. Downs
*Assistant Examiner*—Tariq Hafiz

[57] ABSTRACT

A defuzzifier circuit which is used to obtain a manipulated variable for controlling an actuator by using fuzzy information appearing over a plurality of lines. The defuzzifier circuit can share the membership function with a plurality of converting mechanisms and enables a weight to be set externally.

7 Claims, 5 Drawing Sheets

(a)

(b)
INPUT
- INP1 = Number of Revolutions (For Volume · A/F)
- INP2 = Intake Manifold Pressure
- INP5 = Water Temperature OUTPUT
- OUT 0 = Result of Volume · A/F
- OUT 1 = Kw (a)

(b)
- INP 0
- INP 1 = Number of Revolutions (For Volume · A/F)
- INP 2 = Intake Manifold Pressure
- INP 5 = Water Temperature
- OUT 0 = Result of Volume · A/F Kv
- OUT 1 = Result of Final Reasoning

DEFUZZIFIER CURCUIT

CROSS-REFERENCES TO RELATED APPLICATIONS

This application is a continuation of U.S. Ser. No. 07/845,609, filed Mar. 4, 1992 now abandoned.

BACKGROUND OF THE INVENTION

1. Field of the Invention

The present invention relates to a defuzzifier circuit which converts fuzzy quantities into a determined value in hardware that executes fuzzy reasoning.

2. Description of the Prior Art

Fuzzy information obtained as a result of fuzzy reasoning appears in the form of electric signals distributed over a plurality of lines. Accordingly, it is necessary in order to control an actuator or the like by using these signals to convert them into a manipulated variable. A converting mechanism designed for this purpose is called defuzzifier. In general, the conversion is performed by arithmetically determining the center of gravity of fuzzy quantities (JP Appln No. 63-206007, 1988).

The prior art will be explained below on the basis of the contents of the above-mentioned publication.

One example of fuzzy information will be explained with reference to FIG. 6. Elements of fuzzy information are denoted by x, and it is assumed that there are discrete values $x_1, x_2, \ldots x_{n-1}, x_n$. These elements are output onto a plurality of signal lines $l_1, l_2, \ldots l_n$, respectively, and grades (functional values corresponding to variables) $\mu_1, \mu_2, \ldots \mu_n$ corresponding to these elements are represented by analog voltages or current signals appearing on the respective signal lines.

In this case, the grades $\mu_1, \mu_2, \ldots \mu_n$ are assumed to be represented by voltages. In FIG. 6, the center of gravity (position on the X axis) of fuzzy information is given by $$\text{Center of gravity} = \sum_{i=1}^{n} \mu_i x_i / \sum_{i=1}^{n} \mu_i \quad (1)$$

Accordingly, multiplication, addition and division are needed to obtain the center of gravity. Therefore, in order to obtain the center of gravity only by addition, which is relatively easy, Equation (1) is transformed into Equation (2), and the latter is adjusted so that the denominator in Equation (2) is 1, thus eliminating the need for division:

$$\begin{aligned}\text{Center of gravity} &= \sum_{i=1}^{n} \mu_i x_i / \sum_{i=1}^{n} \mu_i = K \sum_{i=1}^{n} \mu_i x_i / K \sum_{i=1}^{n} \mu_i \\ &= \sum_{i=1}^{n} (K\mu_i) x_i / \sum_{i=1}^{n} (K\mu_i)\end{aligned} \quad (2)$$

That is, if K is adjusted so that the denominator is 1, the center of gravity can be obtained from Equation (3):

$$\text{Center of gravity} = \sum_{i=1}^{n} (K\mu_i) x_i \quad (3)$$

Referring to FIG. 7, which is a specific circuit diagram, voltages $\mu_1, \mu_2, \ldots \mu_n$ representative of elements of fuzzy information are led out onto n signal lines $l_1, l_2, \ldots l_n$ and then multiplied by the coefficient K in a variable-grade reasoning engine 1 to obtain fuzzy quantities $K\mu_1, K\mu_2, \ldots K\mu_n$, which are input to both a weighted summing circuit 2 and a simple summing circuit 3. In the weighted summing circuit 2, calculation of Equation (3) is executed to output a voltage signal representative of the center of gravity.

In the meantime, the simple summing circuit 3 executes calculation of the denominator of Equation (2) and inputs the result of the calculation to a voltage adjusting circuit 4. The other input terminal of the voltage adjusting circuit 4 is supplied with a voltage corresponding to the grade 1. Accordingly, in response to the output signal from the voltage adjusting circuit 4, the coefficient K in the variable-grade reasoning engine 7 is adjusted so that the output from the simple summing circuit 3 is 1 at all times.

According to the above-described prior art, a circuit portion of the fuzzy reasoning circuit which is related to electric signals distributed over a plurality of lines $l_1, l_2, \ldots l_n$ is controlled so that the output signal from the simple summing circuit 3, which is supplied with the electric signals, is equivalent to 1. In this case, the membership function circuit is provided with a grade control means to control the grade of the membership function. In this type of control system, if there are two or more converting elements, these elements cannot share one membership function circuit with each other, so that a membership function circuit must be provided for each converting element. The reason for this is that there is no possibility that grade control signals from all the defuzzifiers will be identical to each other.

In addition, the prior art employs an FET as a feedback resistor of an operational amplifier to adjust the gains of the weighted summing circuit 2 and the simple summing circuit 3 so that the output from the simple summing circuit 3 is equivalent to 1. However, since the FET has no satisfactory linear characteristics, the required accuracy cannot be obtained, so that a costly variable-gain amplifier is needed in practice.

In the above-described prior art, there are cases where the product of a plurality of reasoning results is obtained as a finally demanded value. For example, if the volumetric efficiency $K_v$ of an internal combustion engine and the water temperature correction factor $K_w$ are obtained as determined values by fuzzy reasoning, the value that is finally needed is the product of $K_v$ and $K_w$. In other words, it will be convenient if the output of the defuzzifier for the volumetric efficiency $k_v$ can be weighted by $K_w$.

In addition, weighting necessitates processing of the reasoning results by using a costly multiplier. The weighting process will be explained below with reference to FIG. 8.

FIG. 8(a) is a block diagram showing the arrangement for weighting, and FIG. 8(b) shows input/output port assignment. Inputs INP 1, INP 2, . . . are input to a reasoning engine 5 to reason a volumetric efficiency $K_v$(OUT 0) according to rules (not shown). Similarly, an input INP 5 is input to a reasoning engine 6 to reason a water temperature correction factor $K_w$ (OUT 1) according to rules (not shown). Then, the two reasoning results are input to a multiplier 9 to obtain $K_v \cdot K_w$.

FIG. 9(a) and 9(b) show a system that needs no multiplier. In this system, a volumetric efficiency $K_v$ (OUT 0) is reasoned in a reasoning engine 10, and the result obtained is input to an input port INP 0 to obtain $K_v \cdot K_w$ in a reasoning engine 12. However, these conventional weighting techniques are unsuitable because of an increased number of rules.

SUMMARY OF THE INVENTION

In view of the above-described circumstances, it is a first object of the present invention to provide a defuzzifier circuit which has a simplified circuit configuration and is capable of sharing the membership function with a plurality of defuzzifiers.

It is a second object of the present invention to provide a defuzzifier circuit which is capable of delivering a weighted output with a simple circuit configuration.

BRIEF DESCRIPTION OF THE DRAWINGS

FIG. 9(a) and 8(b) show a conventional weighting technique that employs no multiplier.

DETAILED DESCRIPTION OF THE EMBODIMENTS

Embodiments will be described below with reference to the accompanying drawings.

Figure 1:
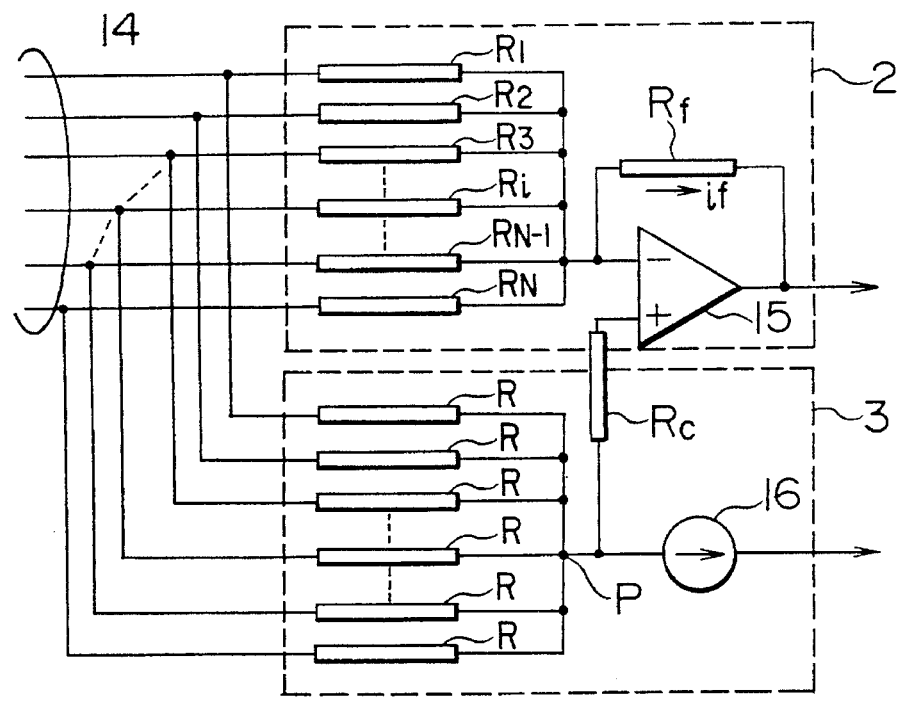
FIG. 1 is a block diagram of one embodiment of the defuzzifier circuit according to the present invention.

Referring to FIG. 1, which is a block diagram of one embodiment of the defuzzifier circuit according to the present invention, a weighted summing circuit 2 is connected to fuzzy buses 14 through weighted summing resistances $R_1, R_2, \ldots, R_i, \ldots R_N$. A common terminal of the weighted summing resistances is connected to a minus terminal of an operational amplifier 15. A plus terminal of the operational amplifier 15 is connected to a common terminal of simple summing resistances through a resistance $R_c$. A resistance $R_f$ is connected between the minus terminal and output terminal of the operational amplifier 15. A current if that flows through the resistance $R_f$ is output as a converted current.

As will be understood from the above description, the downstream side of the weighted summing resistances $R_i$ is connected to the downstream side P of the simple summing resistances by the operational amplifier 15. The downstream side of the weighted summing resistances $R_i$ is herein imaginary-shorted to the downstream side P of the simple summing resistances.

Figure 2:
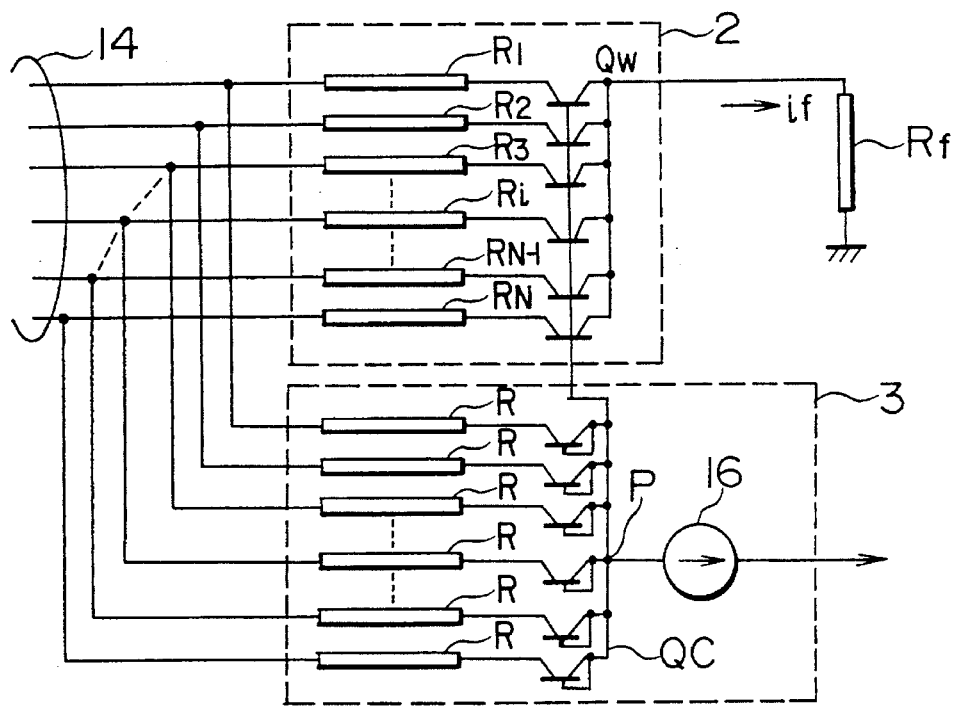
FIG. 2 illustrates in detail the arrangement shown in FIG. 1.

Referring to the detail view of FIG. 2, in the weighted summing circuit 2 the weighted summing resistances $R_1$ to $R_N$ are connected to the fuzzy buses 14 and also connected to the resistance $R_f$ through respective transistors $Q_w$, while in the simple summing circuit 3 the resistance R are connected to the fuzzy buses 14 and also connected to a constant-current source 16 through respective transistors $Q_c$.

The operation will next be explained.

Since the constant-current source 16 is connected to the junction point P of the simple summing circuit 3, only a constant current flows through the simple summing circuit 3. Moreover, since the base potential of the transistors $Q_c$ of the simple summing circuit 3 is imaginary-shorted to the base potential of the transistors $Q_w$ of the weighted summing circuit 2, the potential at the point P is reflected upon the weighted summing circuit 2. For example, when the potential at the point P rises, the current that is supplied to the weighted summing circuit 2 is limited, whereas, when the potential at the point P lowers, the current supplied to the weighted summing circuit 2 increases.

In addition, since the current supply is controlled by the constant-current source 16 so that the value of current flowing to the simple summing circuit 3 is 1, the current $i_f$ flowing to the weighted summing circuit 2 appears as a defuzzified current.

Figure 3:
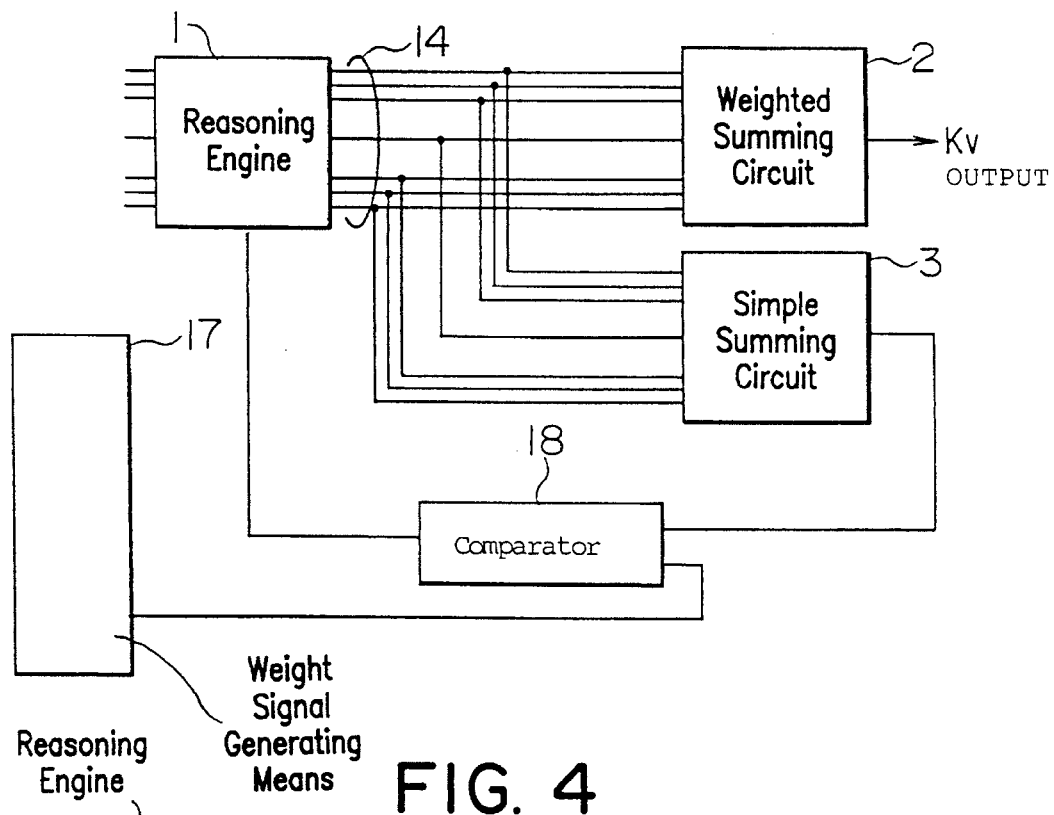
FIG. 3 is a block diagram of another embodiment of the defuzzifier circuit according to the present invention.

FIG. 3 is a block diagram of another embodiment of the present invention, in which the same portions or elements as those in FIGS. 1 and 2 are denoted by the same reference numerals and description thereof is omitted.

A comparator 18 is supplied with output signals from the simple summing circuit 3 and a weight signal generating means 17, and the output of the comparator 18 is supplied to the reasoning engine 1. The other arrangement of this embodiment is the same as in the embodiment shown in FIGS. 1 and 2.

The operation of the second embodiment will be explained. If a signal, e.g., 0.5, from the weight signal generating means 17 is input to the comparator 18 which is in the above-described state, the output that is delivered from the reasoning engine 1 to the fuzzy buses 14 is controlled so that the output of the simple summing circuit 3 is multiplied by 0.5. This output is delivered from the fuzzy buses 14 through the weighted summing circuit 2. In other words, in this case the output $K_v$ is multiplied by 0.5. According to this embodiment, weighting can be effected only by the reasoning defuzzifier circuit.

Figure 4:
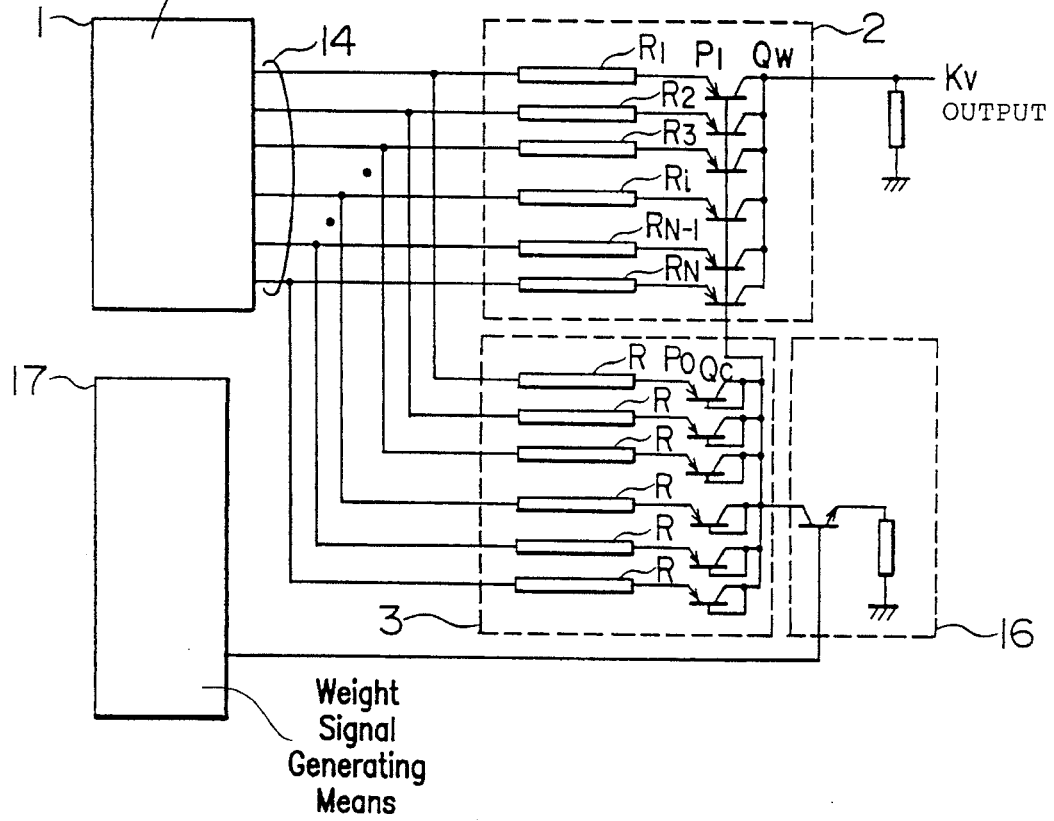
FIG. 4 is a block diagram of still another embodiment of the defuzzifier circuit.

FIG. 4 is a block diagram of still another embodiment of the present invention. In this embodiment, a simple summing circuit 3 is connected to fuzzy buses 14 led out from a reasoning engine 1 through respective resistances R and also connected to a constant-current source 16 through transistors $Q_c$. A weighted summing circuit 2 is connected to the fuzzy buses 14 through weighting resistances $R_1$ to $R_N$, which are connected to the respective emitters of transistors $Q_w$. The constant-current source 16 increases the current value in response to an increase in the weight signal from a weight signal generating circuit 17, resulting in a lowering in the potential at the point $P_0$. Since the point $P_0$ and the point $P_1$ are imaginary-shorted, the potential at $P_1$ also lowers, resulting in an increase in the output current. Accordingly, it is possible to obtain a determined value in accordance with the weight signal.

Figure 5:
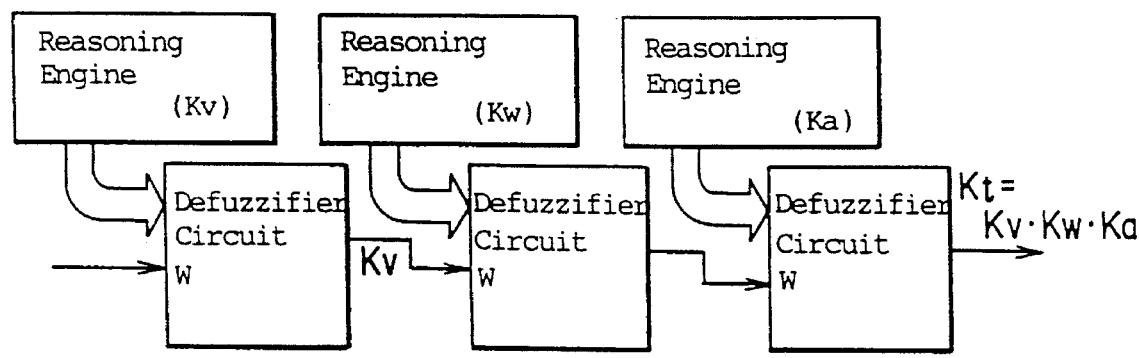
FIG. 5 shows an application example in which the present invention is applied to engine control.
Figure 6:
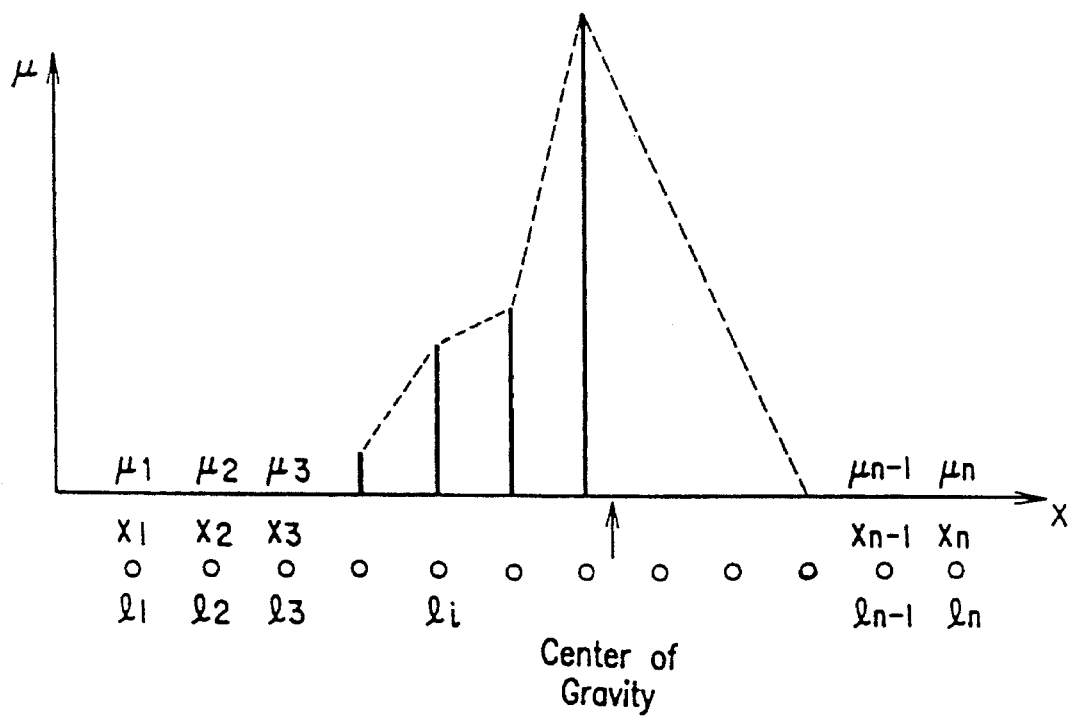
FIG. 6 shows a common example of fuzzy information.
Figure 7:
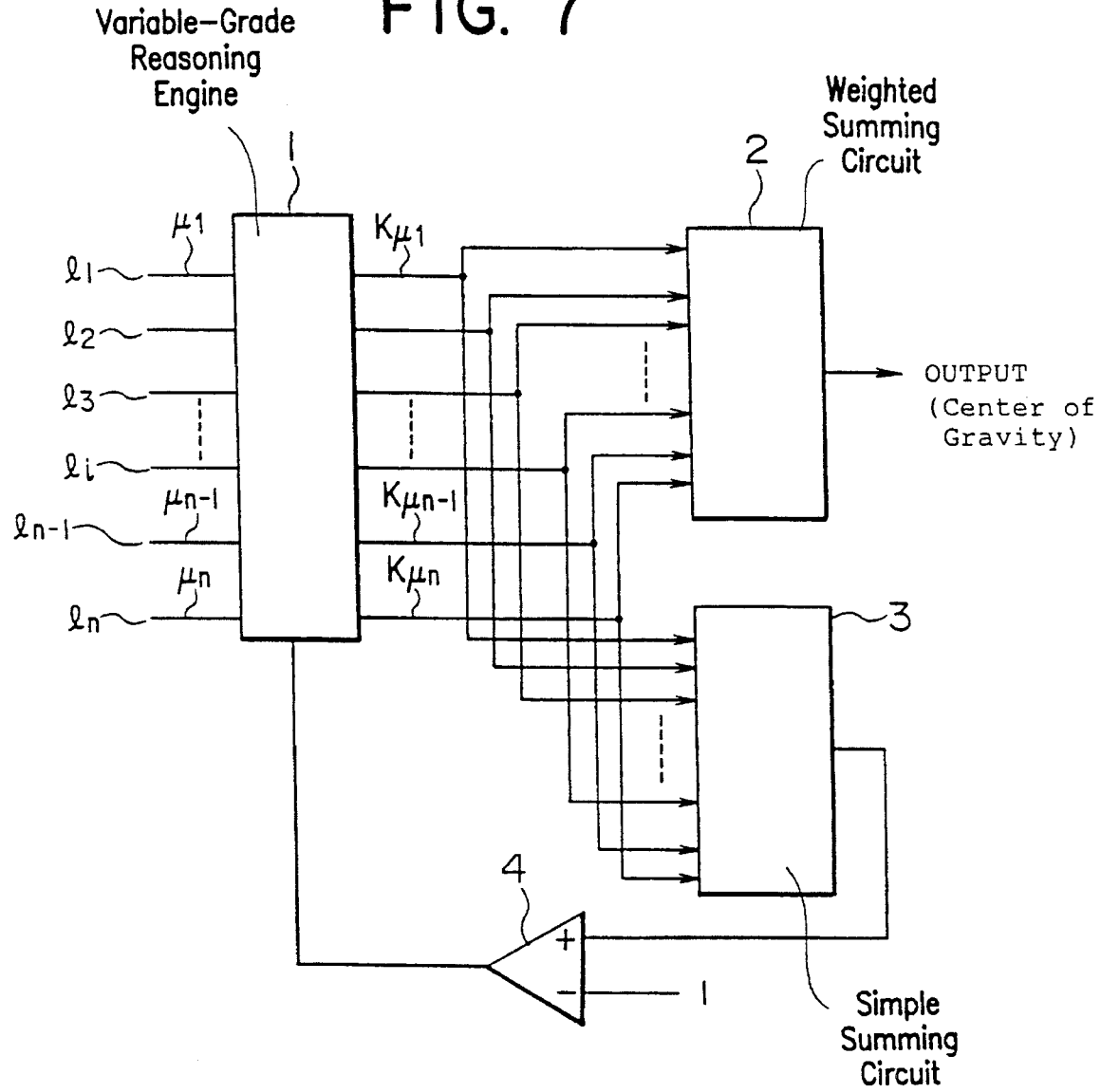
FIG. 7 is a block diagram showing a conventional defuzzifier circuit.
Figure 8:
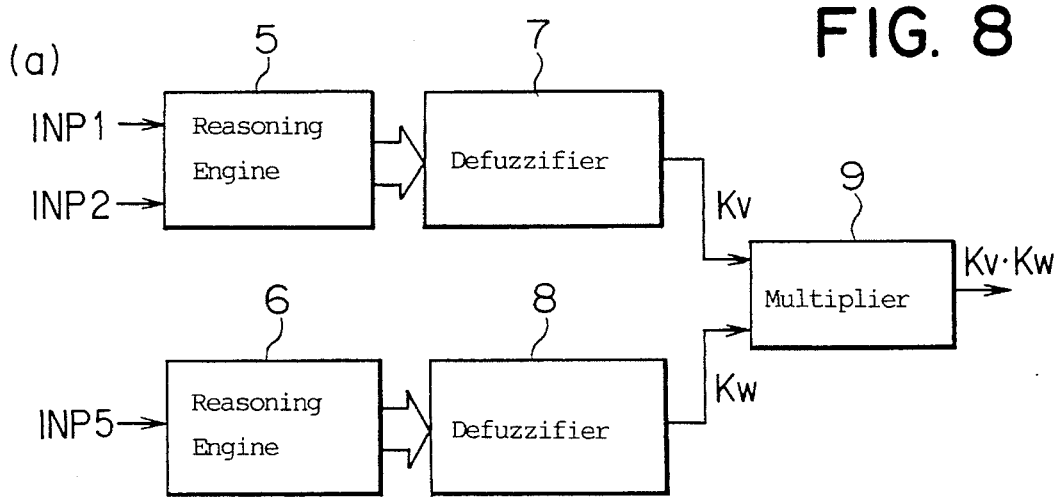
FIG. 8(a) and 8(b) show a conventional weighting technique that employs a multiplier.
Figure 9:
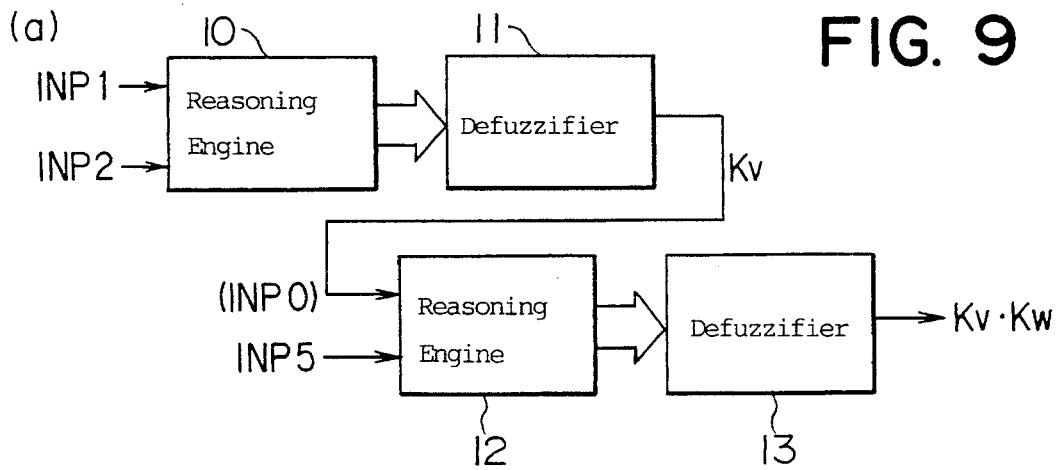

FIG. 5 is a block diagram of a further embodiment of the present invention.

It should be noted that this embodiment is an application example in which the present invention is applied to engine control. To reason an injection quantity of fuel supplied to an internal combustion engine, it is necessary to reason a volumetric efficiency $K_v$, a water temperature correction factor $K_w$ and an intake correction factor $K_a$ of the engine in an operative state and obtain a total correction coefficient $K_t = K_v \cdot K_w \cdot K_a$. Therefore, in this case defuzzifier circuits are connected in series to output a correction coefficient $K_t$.

As has been described above, the defuzzifier circuit according to the present invention has a simplified arrangement and can share the membership function with a plurality of converting mechanisms. In addition, since a weight can be set externally, it is possible to provide a defuzzifier circuit capable of delivering a weighted output with a simple circuit configuration.

What is claimed is:

1. A defuzzifier circuit comprising:

a weighted summing circuit means for receiving electric signals from a plurality of lines representative of fuzzy information distributed over said plurality of lines, multiplying said signals by respective values corresponding to grades of said lines and summing the multiplied values, said weighted summing circuit means having an output;

a simple summing circuit means for receiving said electric signals, modifying said electric signals without weighting and summing said modified signals, said simple summing circuit means having an output;

a constant-current source means for supplying a constant current to said output of said simple summing circuit means; and connecting means connecting said output of said weighted summing circuit means with said output of said simple summing circuit means for equalizing an output voltage of said simple summing circuit means with an output voltage of said weighted summing circuit means.

2. A defuzzier circuit according to claim 1, wherein said constant-current source means is directly connected to said output of said simple summing circuit means.

3. A defuzzier circuit according to claim 1, wherein said constant-current source means is connected to said output of said simple summing circuit means, and said connecting means connects said output of said weighted summing circuit means to said output of said simple summing circuit means at a point between said output of said simple summing circuit means and said constant-source means.

4. A defuzzier circuit according to claim 3, wherein said constant-current source means and said connecting means are arranged so that electric current does not flow between said output of said weighted summing circuit means and said output of said simple summing circuit means.

5. A defuzzifier circuit comprising:

a weighted summing circuit means for receiving electric signals from a plurality of lines representative of fuzzy information distributed over said plurality of lines, multiplying said signals by respective values corresponding to grades of said lines and summing the multiplied values, said weighted summing circuit means having an output;

a simple summing circuit means for receiving said electric signals, modifying said electric signals without weighting and summing said modified signals, said simple summing circuit means having an output;

weight signal generating means for generating an adjustable electric signal corresponding to an externally set weight; and means connected to said output of said simple summing circuit means for receiving an output of summed modified signals from said simple summing circuit means and for receiving said electric signal corresponding to the externally set weight, and modifying an output voltage of said weighted summing circuit means based upon the externally set weight.

6. An apparatus comprising two defuzzifier circuits of claim 5, wherein said defuzzifier circuits are connected in series.

7. A defuzzifier circuit comprising:

a weighted summing circuit means for receiving electric signals from a plurality of lines representative of fuzzy information distributed over said plurality of lines, multiplying said signals by respective values corresponding to grades of said lines and summing the multiplied values, said weighted summing circuit means having an output;

a simple summing circuit means for receiving said electric signals, modifying said electric signals without weighting and summing said modified signals, said simple summing circuit means having an output;

a constant-current source means for a supplying constant current to said output of said simple summing circuit means;

weight signal generating means for generating an adjustable electric signal corresponding to an externally set weight and supplying the set weight to said output of said simple summing circuit means; and connecting means connecting said output of said weighted summing circuit means with said output of said simple summing circuit means for equalizing an output voltage of said simple summing circuit means with an output voltage of said weighted summing circuit means and for modifying said output voltage of said weighted summing circuit means based upon the set weight.

* * * * *